United States Patent [19]

Horodysky

[11] 4,200,546
[45] Apr. 29, 1980

[54] METAL SALT TREATED SULFURIZED OLEFINS AND ORGANIC COMPOSITIONS CONTAINING SAME

[75] Inventor: Andrew G. Horodysky, Cherry Hill, N.J.

[73] Assignee: Mobil Oil Corporation, New York, N.Y.

[21] Appl. No.: 1,552

[22] Filed: Jan. 8, 1979

[51] Int. Cl.² .............. C10M 1/54; C10M 1/38; C10M 3/32; C07G 17/00
[52] U.S. Cl. .............. 252/46.4; 252/389 R; 260/125; 260/139
[58] Field of Search .............. 252/46.4, 389 R; 260/125, 139

[56] References Cited

U.S. PATENT DOCUMENTS

| | | | |
|---|---|---|---|
| 3,594,318 | 7/1971 | O'Neil | 252/46.4 |
| 3,764,534 | 10/1973 | Blejean et al. | 252/46.4 |
| 4,021,419 | 5/1977 | Karn | 260/125 |
| 4,028,259 | 6/1977 | Herd et al. | 260/139 |

Primary Examiner—Irving Vaughn
Attorney, Agent, or Firm—Charles A. Huggett; Raymond W. Barclay; Claude E. Setliff

[57] ABSTRACT

A novel product made by forming the metal salt reaction product of a sulfurized olefin possesses, among other things, a good copper strip corrosivity. Organic composition containing a minor amount thereof also possess good lubricating characteristics.

36 Claims, No Drawings

METAL SALT TREATED SULFURIZED OLEFINS AND ORGANIC COMPOSITIONS CONTAINING SAME

BACKGROUND OF THE INVENTION

1. Field of the Invention

This invention is directed to novel compounds comprising a metal salt treated sulfurized olefin.

2. Summary of the Prior Art

Sulfurized olefins are known to be effective extreme pressure agents or load carrying additives for lubricating oils. See U.S. Pat. Nos. 3,703,504; 3,697,499 and 3,471,404.

However, none of these processes are similar to the instant process nor are the compounds so produced similar to the novel compounds of this invention.

It has now been discovered that a sulfurized olefin is treated with a metal salt, such sulfurized olefin product has improved copper strip corrosivity when added to an organic substrate, e.g. to a lubricating oil.

SUMMARY OF THE INVENTION

This invention is directed to organosulfur compounds comprising the metal salt treated sulfurized olefin.

The sulfurized olefin is derived from a process comprising sulfohalogenating a hydrocarbon olefin having a single double bond and having from 2 to about 8 carbon atoms per molecule with a sulfur halide selected from a group consisting of sulfur chlorides and sulfur bromides to form a sulfohalogenated intermediate and thereafter sulfurizing and dehalogenating said intermediate by treatment with an aqueous alkali metal monosulfide solution such as described in U.S. Pat. No. 3,703,504. The alkali metal monosulfide solution may comprise sodium, potassium, or lithium sulfide and may contain sodium hydroxide, sodium hydrosulfide, sodium cresylates, sodium sulfate, sodium chloride, oil and ferrous sulfide. The metal of the metal salt may be selected from Group IIA and B of the Periodic Table.

This invention is also directed to organic compositions comprising a major amount of an organic medium normally subject to deterioration and a minor amount of the additive of this invention sufficient to impart improved copper corrosion activity thereto. In accordance with this invention, the said organic medium may be a lubricant from among oils of lubricant viscosity, hydrocracked oils, mineral oils or fractions thereof, synthetic oils or mixtures of synthetic and mineral oils, automotive oils, gear oils and trasmission fluids, hydraulic oils, waxes and greases prepared from said oils of lubricating viscosity.

DESCRIPTION OF SPECIFIC EMBODIMENTS

Sulfurized olefins useful herein are generally described in U.S. Pat. No. 3,703,504 the entirety of which is incorporated herein by reference. This class of reactant, however, in not limited thereto.

Sulfurized olefins made by variations of these processes or by other processes known to the art which contain sulfur may be employed in the invention. Dimethallyl sulfides such as:

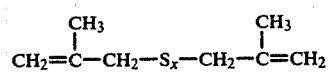

where $x = 1, 2, 3, 4$ etc. which can be formed by the reaction of methallyl chloride with an alkali metal monosulfide, alkali metal disulfide or alkali metal polysulfide, may be employed in this invention. Other high sulfur content sulfurized hydrocarbons may likewise be employed in this invention.

Generally speaking, the sulfurized olefins are obtained via a process which comprises sulfohalogenating an olefin with a sulfur halide in the presence of a catalytic quantity (i.e., 0.2–10 wt. % based on the halide) of a lower aliphatic alcohol having up to about 10 carbon atoms (e.g., methanol, ethanol, propanol i-propanol, butanol, i-butanol, etc.) to form a sulfohalogenated organic intermediate, and thereafter sulfurizing and dehalogenating said intermediate in the presence of a substantial quantity of lower aliphatic alcohol, e.g., from 10 to about 50% by weight of the adduct by treatment with an aqueous alkali metal sulfide solution, or an aqueous alkali metal monosulfide solution (which can be derived, for example, from a spent aqueous alkali metal hydroxide effluent from hydrocarbon purification) having a substantial combined sulfur content, thus producing an organic sulfide of high combined sulfur content.

A wide variety of olefin substances may be charged to the initial sulfochlorination reaction, including olefins having a single terminal or internal double bond. The olefinic substances usually contain from about 2 to 8 or more carbon atoms per molecule and may be either straight, branched chain or cyclic. These may be exemplified by ethylene, propylene, butene-1, cis- and trans-butene-2, isobutylene, diisobutylene, triisobutylene, the pentenes, cyclopentene, the hexenes, cyclohexene, the octenes and decene-1. Isobutylene is the preferred olefinic reactant. In general, $C_{3-6}$ olefins or mixtures thereof are desirable for preparing sulfurized products for use herein as lube oil additives. The combined sulfur content of the product decreases with increasing carbon content while its miscibility with oil is lower for propylene and ethylene derivatives.

The other reactant in the first stage is preferably sulfur monochloride ($S_2Cl_2$), but other similar compounds, such as sulfur dichloride and $S_3Cl_2$ and the corresponding sulfur bromides may be employed in an amount which will provide a quantity of sulfur corresponding to desirable reactant ratios for sulfur monochloride. The molar ratio of olefin to sulfur monohalide may range from about 1:1 up to 1.7:1 or more. In the case of isobutylene and sulfur monochloride, the optimum ratio appears to be between about 1.55:1 and 1:60:1.

The initial reaction can be catalyzed with a lower aliphatic alcohol containing from 1 to 4 carbon atoms, as exemplified by methanol, ethanol, propanol and isopropanol. Of these, methanol and ethanol are usually preferred. The spent aqueous alkali metal hydroxide effluent as mentioned hereinabove is derived primarily from spent organic caustic liquors issuing from integrated refinery processes.

The sulfurized olefins produced by the above-described process have very high sulfur content, i.e. more than about 35% by weight (typically about 46–48% of combined sulfur) and are substantially devoid of free sulfur. Other sulfurized olefins made by variations of this process or by other processes known to the art which have a sulfur content of about 30% and above may also be employed in this invention.

The reaction is usually carried out at temperatures of from about 75° to 120° C., preferably from 80°–110° C., under atmospheric pressure (although higher pressures may be used if desired) for periods of up to about 16–20 hours, e.g., preferably from about 1 to about 10 hours or more. The reaction mixture is heated with agitation to the desired temperature. The reaction may also be carried out in the absence of any added solvent or it may be carried out in a non-reactive solvent such as pentane, hexane, heptane, cyclohexane, benzene, toluene and the like, or a refined petroleum oil may be employed therefor. Further, the reaction may be carried out in a more polar solvent such as ethanol, isopropanol, or one of the butanols. In some cases, isopropanol is preferred.

The metal compounds usable to form the salts are those containing metals from Group II of the Periodic Table. These metals include magnesium, calcium, zinc, barium and cadmium. The preferable metals are zinc, calcium and magnesium. The anion can be selected from among the oxides, hydroxides, carbonates, acetates and citrates. The oxides and hydroxides are preferred.

The reaction to form the product is carried out at temperatures of from about 40° C. to about 135° C., preferably about 70° C. to about 95° C. for from about 1 to about 20 hours, preferably from about 2 to about 3 hours.

The novel product obtained from metal salt treatment of sulfurized olefins (such as those sulfurized olefins disclosed in U.S. Pat. No. 3,703,504) may be used effectively to impart to organic media, particularly to lubricating oils and greases, the properties mentioned hereinabove. An effective amount of the additive compound will range from about 0.01% to about 10% by weight. Preferably the organic medium or substrate, e.g., oil of lubricating viscosity contains from about 0.01 to 5% of the additive and more preferably from about 0.05 to about 2.5% by weight thereof, based on the total weight of the lubricant composition. As hereinbefore indicated, the additive of this invention may be incorporated into any lubricating media, including mineral oils of lubricating viscosity and greases thereof. In general, synthetic oils or combinations thereof can also be provided effective protection against the above-noted deterioration or degradation. These synthetic oils may be used alone, combined with mineral oils, or with each other and used as a lubricating oil or as grease vehicles. Typical synthetic vehicles include synthetic hydrocarbons such as polyisobutylene, polybutenes, hydrogenated polydecenes, the polyglycols, including polypropylene glycol, polyethylene glycol, synthetic ester oils illustrated by trimethlolpropene esters, neopentyl alcohol and pentaerythritol ester, di(2-ethylhexyl) sebacate, di(2-ethylhexyl)adipate, dibutyl phthalate and other types, as for example, fluorocarbons, esters of phosphorus-containing acids, liquid ureas, ferrocene derivatives, hydrogenated mineral oils, chain-type polyphenols, siloxanes and silicones (polysiloxanes), alkyl-substituted diphenyl ethers typified by a butyl-substituted bis(p-phenoxyphenyl)ether and phenoxyphenyl ether.

In the following description, Examples 1 and 2 illustrate the preparation of the sulfurized olefin. Examples 3 through 6 illustrate the metal salt treatment of the sulfurized olefin.

EXAMPLE 1

Preparation of Sulfurized Olefin

Sulfurized olefin was prepared in accordance with Example 1 of U.S. Pat. 3,703,504 using isobutylene. The yield of sulfurized organic product amounted to 98% of theory. It had a sulfur content of 43% by weight and a chlorine content of only 0.38%, as well as a clear, light orange brown color, and a high flash point of 250° F.

EXAMPLE 2

Preparation of Sulfurized Olefin

Sulfurized olefin was prepared in general accordance with Example 6 of U.S. Pat. No. 3,703,504. A mixture of butylenes was sulfurized using the same reaction conditions described and an equivalent molar ratio of flake sodium monosulfide ($Na_2S$). The olefin mixture employed in this instance had the following composition by volume:

| Component | Volume Percent |
|---|---|
| Isobutylene | 90.5 |
| Trans-2-butane | 5.9 |
| Cis-2-butene | 2.6 |
| Butadiene | 1.0 |
| | 100.0 |

The product had the following characteristics:
Sulfur content—46%
Chlorine content—0.27%
Viscosity—12.1 cs/210° F.

EXAMPLE 3

About 530 g. of the sulfurized olefin as prepared in Example 1 was charged to a reaction vessel equipped with a reflux condenser and stirrer. Zinc oxide (10 g.) and isopropanol (55 g.) were added and the contents of the reactor were heated to 80°–85° C. and held for 4½ hours with stirring. The alcohol was removed by distillation and the product was filtered to remove unreacted zinc oxide. A total of 510 g. of a clear orange liquid was recovered. The product contained 46.5% carbon and 6.9% hydrogen.

EXAMPLE 4

About 350 g. of sulfurized olefin as prepared in Example 1, 3.5 g. of zinc oxide and 35 g. of isopropanol were reacted substantially as described in Example 4, i.e. for 5 hours at about 90° C. with stirring. The alcohol was removed by distillation and the product was filtered, leaving 335 g. of a clear orange liquid.

EXAMPLE 5

About 130 g. of sulfurized olefin as prepared in Example 2 was charged to a reaction vessel equipped with a reflux condenser and stirrer. Calcium oxide (6.0 g.) and approximately 30 g. of isopropanol solvent were added and the contents of the reactor were heated to 80°–85° C. and held there for 6 hours with stirring. The alcohol was removed by distillation and the product was filtered to remove unreacted calcium oxide. The product was a clear orange-brown liquid containing 49% carbon and 7.5% hydrogen.

EXAMPLE 6

About 145 g. of sulfurized olefin as prepared in Example 2, 6.0 g. of magnesium oxide and approximately 30 g. of isopropanol were reacted substantially as described in Example 5, i.e., for 5 hours at about 85° C. with stirring. The alcohol was removed by distillation and the product was filtered, leaving a clear orange liquid. The product contained 46% carbon and 7.4% hydrogen.

EVALUATION OF PRODUCTS

Copper Corrosion

Representative compounds were tested for copper corrosivity using ASTM No. D 130-75 at 210° F. for 6 hours. The base oil was a 200-second solvent paraffinic neutral mineral oil. The table below summarizes the results. The table also summarizes other properties of the products.

| Property | Example 1 | Example 2 | Example 3 | Example 4 | Example 5 | Example 6 |
|---|---|---|---|---|---|---|
| S, wt. % | 43 | 46 | 41 | 42 | 46 | 47 |
| Cl, wt. % | 0.38 | 0.27 | 0.36 | 0.34 | 0.21 | 0.16 |
| Copper Strip Corrosivity 3% in 200" solvent paraffinic neutral mineral oil | 3B | 3A | 2A | 2A | 2B | 2E |

I claim:

1. A metal salt reaction product of a sulfurized olefin prepared by reacting a sulfurized olefin with a metal compound, the metal of said compound being selected from Group IIA and B of the Periodic Table.

2. The compound of claim 1 wherein the sulfurized olefin is sulfurized isobutylene.

3. The compound of claim 1 wherein the sulfurized olefin is a sulfurized mixture of butylenes.

4. The compound of claim 1 wherein said compound is an oxide.

5. The compound of claim 1 wherein said compound is a hydroxide.

6. The compound of claim 1 wherein said compound is a salt of a carboxylic acid.

7. The compound of claim 1 wherein said metal salt reaction product is the zinc salt reaction product of said sulfurized olefin.

8. The compound of claim 1 wherein said metal salt reaction product is the calcium salt reaction product of said sulfurized olefin.

9. The compound of claim 1 wherein said metal salt reaction product is the magnesium salt reaction product of said sulfurized olefin.

10. The compound of claim 7 wherein said metal salt reaction product is prepared using zinc oxide.

11. The compound of claim 8 wherein said metal salt reaction product is prepared using calcium oxide.

12. The compound of claim 9 wherein said metal salt reaction product is prepared using magnesium oxide.

13. A lubricant composition comprising lubricant and from about 0.01 to about 10% by weight of said composition of a metal salt reaction product of a sulfurized olefin prepared by reacting a sulfurized olefin with a metal compound, the metal of said compound being selected from Group IIA and B of the Periodic Table.

14. The composition of claim 13 wherein the sulfurized olefin is sulfurized isobutylene.

15. The composition of claim 13 wherein the sulfurized olefin is a sulfurized mixture of butylenes.

16. The composition of claim 13 wherein said compound is an oxide.

17. The composition of claim 13 wherein said compound is a hydroxide.

18. The composition of claim 13 wherein said compound is a salt of a carboxylic acid.

19. The composition of claim 13 wherein said metal salt reaction product is the zinc salt reaction products of said sulfurized olefin.

20. The composition of claim 13 wherein said metal salt reaction product is the calcium salt reaction product of said sulfurized olefin.

21. The composition of claim 13 wherein said metal salt reaction product is the magnesium salt reaction product of said sulfurized olefin.

22. The composition of claim 19 wherein said metal salt reaction product is prepared using zinc oxide.

23. The composition of claim 20 wherein said metal salt reaction product is prepared using calcium oxide.

24. The composition of claim 21 wherein said metal salt reaction product is prepared using magnesium oxide.

25. A process for preparing a metal salt reaction product of a sulfurized olefin which comprises the step of reacting said sulfurized olefin with a metal compound, the metal of said compound being selected from Group IIA and B of the Periodic Table.

26. The process of claim 25 wherein the sulfurized olefin is sulfurized isobutylene.

27. The process of claim 25 wherein the sulfurized olefin is a sulfurized mixture of butylenes.

28. The process of claim 25 wherein said compound is an oxide.

29. The process of claim 25 wherein said compound is a hydroxide.

30. The process of claim 25 wherein said compound is a salt of a carboxylic acid.

31. The process of claim 25 wherein said metal salt reaction product is the zinc salt reaction product of said sulfurized olefin.

32. The process of claim 25 wherein said metal salt reaction product is the calcium salt reaction product of said sulfurized olefin.

33. The process of claim 25 wherein said metal salt reaction product is the magnesium salt reaction product of said sulfurized olefin.

34. The process of claim 31 wherein said metal salt reaction product is prepared using zinc oxide.

35. The process of claim 32 wherein said metal salt reaction product is prepared using calcium oxide.

36. The process of claim 33 wherein said metal salt reaction product is prepared using magnesium oxide.

* * * * *